(12) United States Patent
Martikian

(10) Patent No.: US 8,443,094 B2
(45) Date of Patent: May 14, 2013

(54) COMPUTER SYSTEM COMPRISING A COMMUNICATION DEVICE

(75) Inventor: Pablo A. Martikian, Meylan (AR)

(73) Assignee: Oracle America, Inc., Redwood City, CA (US)

( * ) Notice: Subject to any disclaimer, the term of this patent is extended or adjusted under 35 U.S.C. 154(b) by 1272 days.

(21) Appl. No.: 11/127,210

(22) Filed: May 12, 2005

(65) Prior Publication Data

US 2006/0259539 A1    Nov. 16, 2006

(51) Int. Cl.
G06F 15/16    (2006.01)

(52) U.S. Cl.
USPC .......................................................... 709/230

(58) Field of Classification Search ................... 709/223, 709/230–237, 203
See application file for complete search history.

(56) References Cited

U.S. PATENT DOCUMENTS

| | | | | |
|---|---|---|---|---|
| 5,050,088 A * | 9/1991 | Buckler et al. ................. | 700/96 |
| 5,974,547 A * | 10/1999 | Klimenko ........................ | 713/2 |
| 6,003,084 A * | 12/1999 | Green et al. .................... | 709/227 |
| 6,012,088 A * | 1/2000 | Li et al. .......................... | 709/219 |
| 6,089,456 A * | 7/2000 | Walsh et al. ............. | 235/472.01 |
| 6,487,605 B1 * | 11/2002 | Leung ............................ | 709/245 |
| 6,505,300 B2 * | 1/2003 | Chan et al. ..................... | 713/164 |
| 6,519,714 B1 * | 2/2003 | Sweet et al. .................... | 714/28 |
| 6,546,425 B1 * | 4/2003 | Hanson et al. ................. | 709/227 |
| 6,629,145 B1 * | 9/2003 | Pham et al. .................... | 709/230 |
| 6,684,327 B1 * | 1/2004 | Anand et al. ................... | 713/2 |
| 6,917,976 B1 * | 7/2005 | Slaughter et al. ............. | 709/226 |
| 6,957,276 B1 * | 10/2005 | Bahl ............................. | 709/245 |
| 6,996,085 B2 * | 2/2006 | Travostino et al. ........... | 370/338 |
| 7,023,878 B2 * | 4/2006 | Ho ................................ | 370/465 |
| 7,028,212 B1 * | 4/2006 | Nair et al. ..................... | 714/4 |
| 7,068,597 B1 * | 6/2006 | Fijolek et al. ................. | 370/230 |
| 7,072,337 B1 * | 7/2006 | Arutyunov et al. ........... | 370/389 |
| 7,096,273 B1 * | 8/2006 | Meier ........................... | 709/236 |
| 7,107,326 B1 * | 9/2006 | Fijolek et al. ................. | 709/220 |
| 7,127,524 B1 * | 10/2006 | Renda et al. ................... | 709/245 |
| 7,130,895 B2 * | 10/2006 | Zintel et al. ................... | 709/220 |
| 7,231,660 B1 * | 6/2007 | Daude et al. ................... | 726/4 |
| 7,305,466 B1 * | 12/2007 | Kaffine et al. ................. | 709/224 |
| 7,379,857 B2 * | 5/2008 | Piesco ............................ | 703/21 |
| 7,471,638 B2 * | 12/2008 | Torrey et al. ................... | 370/248 |
| 7,571,308 B1 * | 8/2009 | Bahl et al. ..................... | 713/151 |
| 8,005,958 B2 * | 8/2011 | Hannel et al. ................. | 709/227 |
| 8,086,732 B1 * | 12/2011 | Volz et al. ..................... | 709/225 |
| 2001/0032149 A1 * | 10/2001 | Fujiwara ........................ | 705/26 |
| 2002/0078188 A1 * | 6/2002 | Anand et al. ................... | 709/222 |
| 2002/0098840 A1 * | 7/2002 | Hanson et al. ................. | 455/435 |

(Continued)

Primary Examiner — Hua Fan
Assistant Examiner — Marcus McKenzie
(74) Attorney, Agent, or Firm — Marsh Fischmann & Breyfogle, LLP; Jonathan A. Szumny; Kent A. Lembke

(57) ABSTRACT

In a system, a communication device capable of exchanging messages through a local network, such messages being exchanged according to a given network protocol; a discovery agent capable of sending a first message according to the network protocol through the communication device, the first message comprising an identification data and a first message content satisfying a second protocol, and the second protocol implying a response from another computer to the first message; an analysis agent capable of recovering a second message received in response to first message, and of extracting from the second message a second message content according to the second protocol, the second protocol implying a further response to be sent to the second message; and a controller capable of operating said discovery agent and the analysis agent over a selected period of time, while refraining the computer system from sending a response to the second message.

16 Claims, 4 Drawing Sheets

U.S. PATENT DOCUMENTS

| | | | |
|---|---|---|---|
| 2002/0112076 A1* | 8/2002 | Rueda et al. | 709/245 |
| 2003/0005096 A1* | 1/2003 | Paul et al. | 709/222 |
| 2003/0055976 A1* | 3/2003 | Hartmann et al. | 709/227 |
| 2003/0061323 A1* | 3/2003 | East et al. | 709/223 |
| 2003/0088650 A1* | 5/2003 | Fassold et al. | 709/220 |
| 2003/0110294 A1* | 6/2003 | Luo | 709/245 |
| 2003/0115345 A1* | 6/2003 | Chien et al. | 709/229 |
| 2003/0126262 A1* | 7/2003 | Yoshida et al. | 709/226 |
| 2003/0145073 A1* | 7/2003 | Lee | 709/223 |
| 2003/0191623 A1* | 10/2003 | Salmonsen | 703/24 |
| 2003/0204611 A1* | 10/2003 | McCosh et al. | 709/230 |
| 2004/0049624 A1* | 3/2004 | Salmonsen | 710/306 |
| 2004/0049714 A1* | 3/2004 | Marples et al. | 714/43 |
| 2004/0073651 A1* | 4/2004 | Beaulieu et al. | 709/223 |
| 2004/0103189 A1* | 5/2004 | Cherkasova et al. | 709/224 |
| 2004/0123153 A1* | 6/2004 | Wright et al. | 713/201 |
| 2004/0158640 A1* | 8/2004 | Philbrick et al. | 709/230 |
| 2004/0162992 A1* | 8/2004 | Sami et al. | 713/200 |
| 2005/0071675 A1* | 3/2005 | Chu et al. | 713/201 |
| 2006/0029016 A1* | 2/2006 | Peles | 370/328 |
| 2006/0187858 A1* | 8/2006 | Kenichi et al. | 370/254 |
| 2006/0195610 A1* | 8/2006 | Cole et al. | 709/245 |
| 2006/0206749 A1* | 9/2006 | Narayanan Nair et al. | 714/4 |
| 2007/0211693 A1* | 9/2007 | Hirsimaki et al. | 370/352 |
| 2007/0297349 A1* | 12/2007 | Arkin | 370/255 |
| 2008/0144830 A1* | 6/2008 | Luo | 380/270 |

* cited by examiner

COMPUTER SYSTEM COMPRISING A COMMUNICATION DEVICE

FIELD OF THE INVENTION

This invention is related to the monitoring of communications within a network.

BACKGROUND

A network may comprise nodes, which may diskless nodes, and one or more servers. The communications within the network may be made according to a network protocol (first protocol). Another protocol (second protocol) may be used additionally, e.g. for the communications between a node and a server.

An example of second protocol is the "Dynamic Host Configuration Protocol", or DHCP protocol. It makes it possible for a network node to automatically obtain an IP address from a DHCP server. The IP address may be valid for a predetermined period of time, in a so-called "IP address lease" mode. Upon expiration of such an "IP address lease", the DHCP protocol further permits that the node either keeps the same IP address, or gets a new one.

The DHCP protocol is of interest in networks operating with diskless nodes, i.e. being deprived from a bootable local hard drive and from other bootable devices. In such networks, the diskless nodes will have to boot otherwise, e.g. via DHCP.

Problems may occur with nodes attempting to boot via DHCP. Then, the diagnosis of such a problem is much harder to do than with a conventional computer, since little or no information on what happened is accessible. The diagnosis becomes even more complicated in high availability clusters with many diskless nodes, while several DHCP servers are available in the same subnet. As known, a subnet is a set of computers connected to one or more servers which share a common IP address portion, e.g. a common IP address prefix.

The prior art comprises utilities capable of starting a DHCP handshaking, by generating a discover message ("DHCPDISCOVER"). However, those utilities can only be used with a local existing network interface of a computer or node. Thus, they do not offer any flexibility of network interface emulation. Moreover, after a successful DHCP handshaking, those utilities will proceed to finish with the DHCP protocol sequence. Thus, they will assign the new dynamic configuration to the local computer or node, and perform modifications to the DHCP tables in the server accordingly. This also influences the condition of the network, which is undesirable at the time of debugging.

In the event a user is trying to diagnose the network for an issue with the DHCP servers, those utilities are unadapted. Here and in the following description, the term "user" is used to refer to a person trying to use the boot-faltering computer, a network maintenance personnel or any person qualified to try and solve the problem being encountered.

The invention aims at improving the situation.

SUMMARY OF THE INVENTION

Broadly, the invention uses the monitoring and sniffing of communications, e.g. DHCP communications, between a computer system comprising at least one communication device and at least one DHCP server on a network. The computer system may act as a node in the network, at least partially.

Thus, there is proposed a computer system comprising
a communication device capable of exchanging messages through a local network, such messages being exchanged according to a given network protocol,
a discovery agent capable of sending a first message according to said network protocol through said communication device, said first message comprising an identification data and a first message content satisfying a second protocol (such as DHCP), and said second protocol implying a response from another computer to said first message,
an analysis agent capable of recovering a second message received in response to the first message, and of extracting from said second message a second message content according to said second protocol, said second protocol implying a further response to be sent to said second message, and
a controller capable of operating said discovery agent and said analysis agent over a selected period of time, while refraining the computer system from sending a response to said second message.

Such a computer system can initiate a communication with another computer according to the second protocol with the first message. After this initialization, it can further analyze the other computer's answers, which are contained in the second message. This analysis has no or little influence on the network since the communication according to the second protocol is not completed.

This is particularly interesting: A user working to perform a diagnosis on one or several DHCP servers can use this system and interact with the servers taking the role of the diskless node that cannot boot. Moreover, the diagnosis has absolutely no influence on the DHCP servers, since the DHCP protocol is not completed.

There is also proposed a method for testing a network, comprising the steps of:
a. providing a selected identification data and a first message content satisfying a handshaking protocol,
b. sending a first message on the network according to a network protocol, said first message containing said identification data and said first message content, said handshaking protocol implying a response from another computer to said first message, and
c. for a selected period of time, recovering available second messages in response to said first message, said handshaking protocol implying a further response to said second message, and extracting from each said second message a second message content according to said handshaking protocol while refraining from sending a response to said second message according to said handshaking protocol.

Other features and advantages of the invention will appear more clearly in the following description given by way of example and in a non restrictive manner of the figures on the annexed drawings on which:

DETAILED DESCRIPTION

Figures 1, 2:
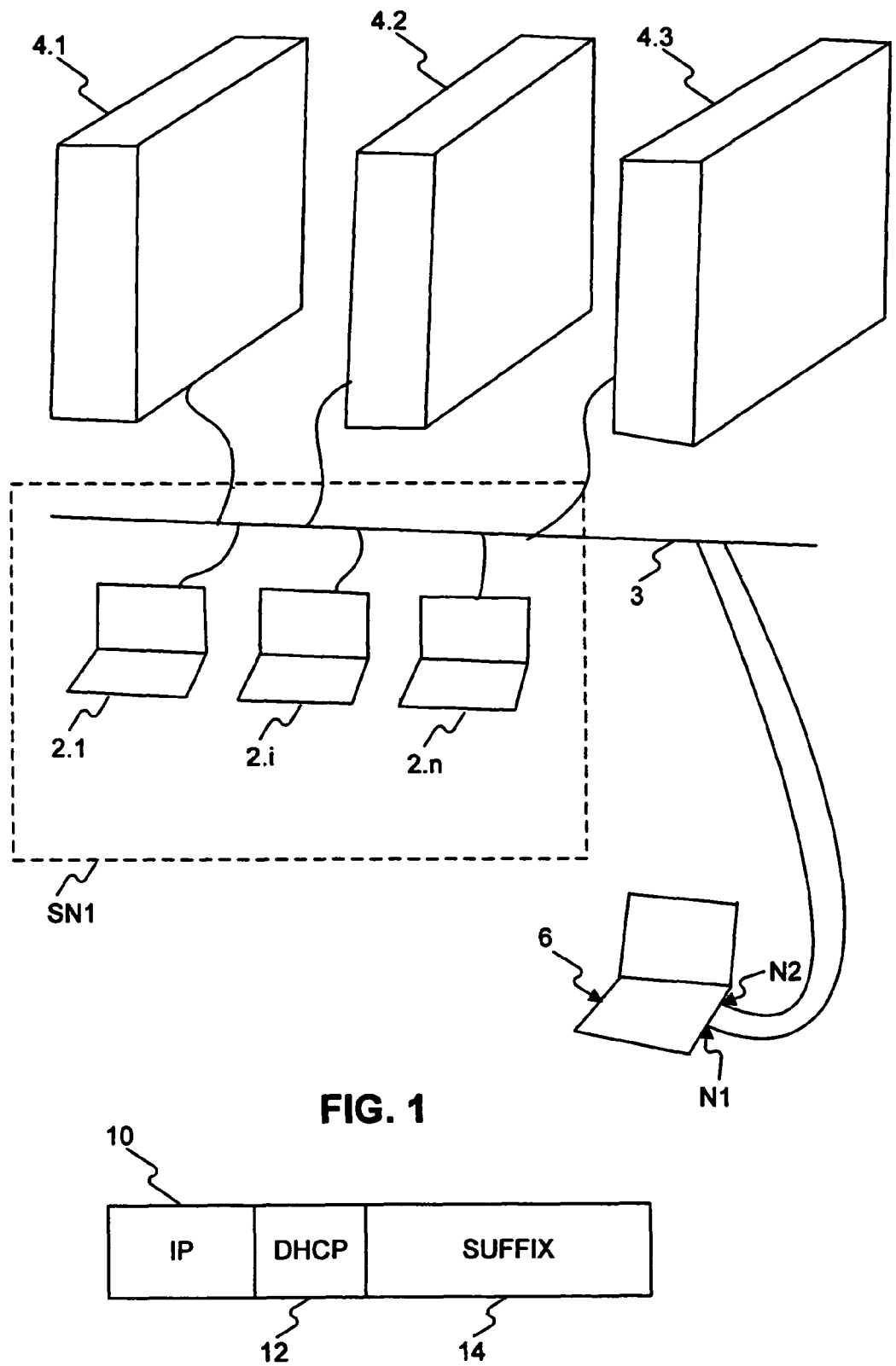
FIG. 1 shows a subnet comprising a set of diskless nodes as well as a computer system according to the invention.
FIG. 2 shows the general form of a TCP/IP packet.

As seen on FIG. 1, several diskless computers 2.1, 2.$i$ to 2.$n$ are connected to a network SN1 by a network medium 3.

Those diskless computers 2.1, 2.*i* to 2.*n* are supposed to boot via DHCP using a network interface each of them comprises. This network interface receives upon booting all necessary information from DHCP servers.

In the example shown, there are three DHCP servers 4,1, 4.2 and 4.3 for the network SN1. On the network SN1, diskless computers 2,1, 2.*i* to 2.*n* have a fixed IP address. This means that each of the DHCP servers 4.1, 4.2 and 4.3 contains a correspondence table matching an IP address with a MAC address. In the example shown, only two of these servers, server 4.1 and 4.3 can help computer 2.*i* boot via DHCP. This is due to the fact that only those two servers have a correspondence table containing the MAC address of the network interface of computer 2.*i*.

Computer 2.*i* is a SUN UltraSPARC® network station which boots via DHCP by sending a message on the broadcast address of network SN1 and waiting for an answer from the DHCP servers 4.1 and 4.3.

This type of message is sent as a conventional TCP/IP packet. FIG. 2 shows the typical structure such a packet. A TCP/IP packet for DHCP booting contains an IP header 10 followed by a UDP message 12 and a suffix 14. The UDP message 12 contains the DHCP information. This means that UDP message 12 is in accordance with the DHCP protocol.

As shown, an additional computer 6 is also connected to the network SN1 in order to monitor a defective communication between computer 2 and the DHCP servers 4. In this example, additional computer 6 comprises two network interfaces N1 and N2 shown in FIG. 4.

Figure 3:
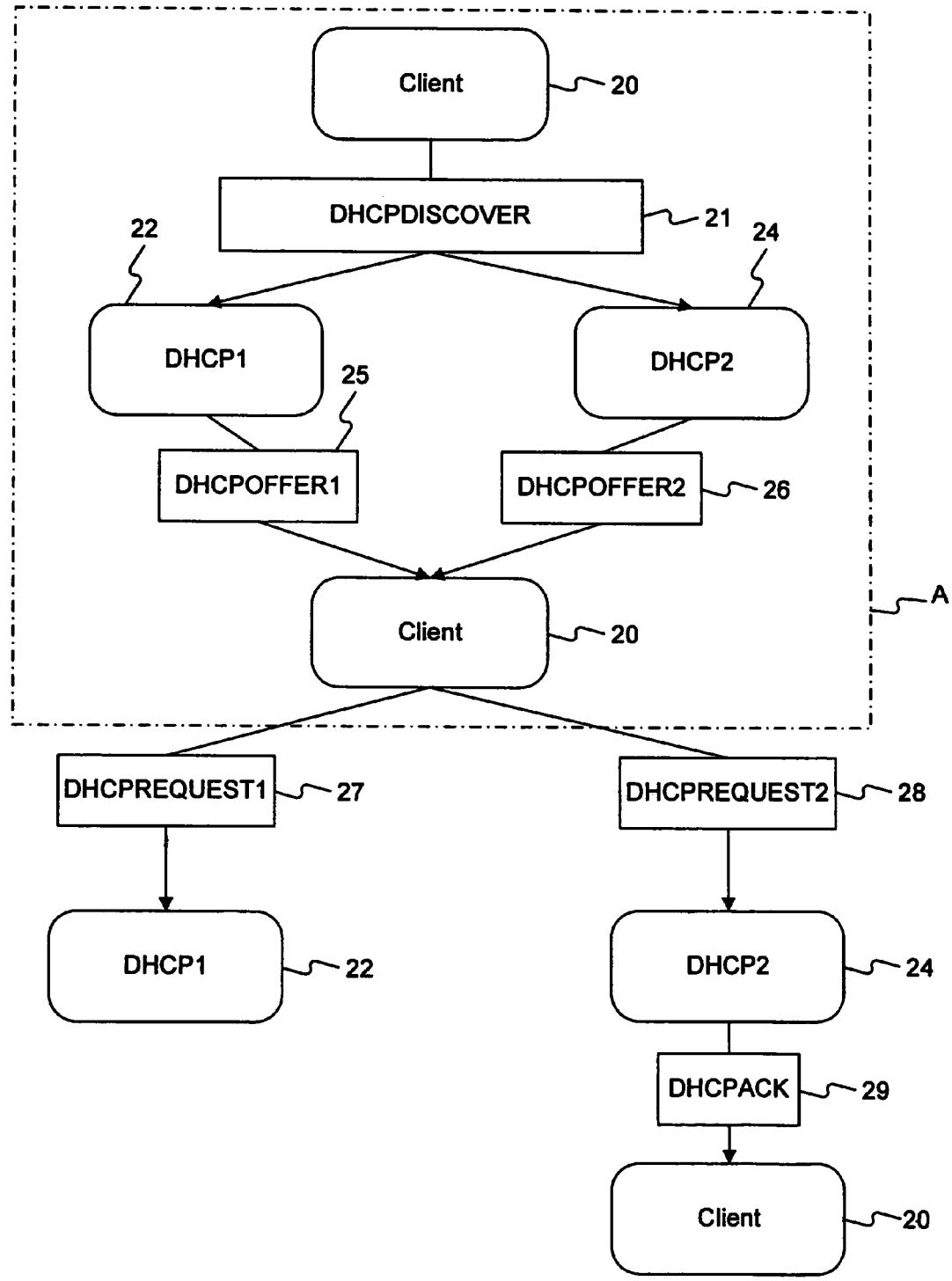
FIG. 3 shows a flow chart of part of a DHCP handshaking between a DHCP client and two DHCP servers.

The DHCP mechanisms will now be described. FIG. 3 shows the first part of a DHCP handshaking between a network client 20 and two servers DHCP1 22 and DHCP2 24. This handshaking is based on an exchange of messages according to the DHCP protocol. The DHCP protocol is defined in RFC 2131.

FIG. 3 shows the first part of a DHCP handshaking between the client and the servers, which comprises the steps of:

broadcasting a DHCPDISCOVER message 21 over a broadcast address of the network, listening to the broadcast address of the network for a DHCPOFFER1 message 25 from server 22 and for a DHCPOFFER2 message 26 from server 24, each message containing an IP configuration proposed by either server, choosing an offer and emitting a DHCPREQUEST1 message 27 and a DHCPREQUEST2 message 28 each intended respectively to server 22 and server 24, and receiving a DHCPACK message 29 confirming the lease of IP address from the chosen DHCP server 24.

Figure 4:
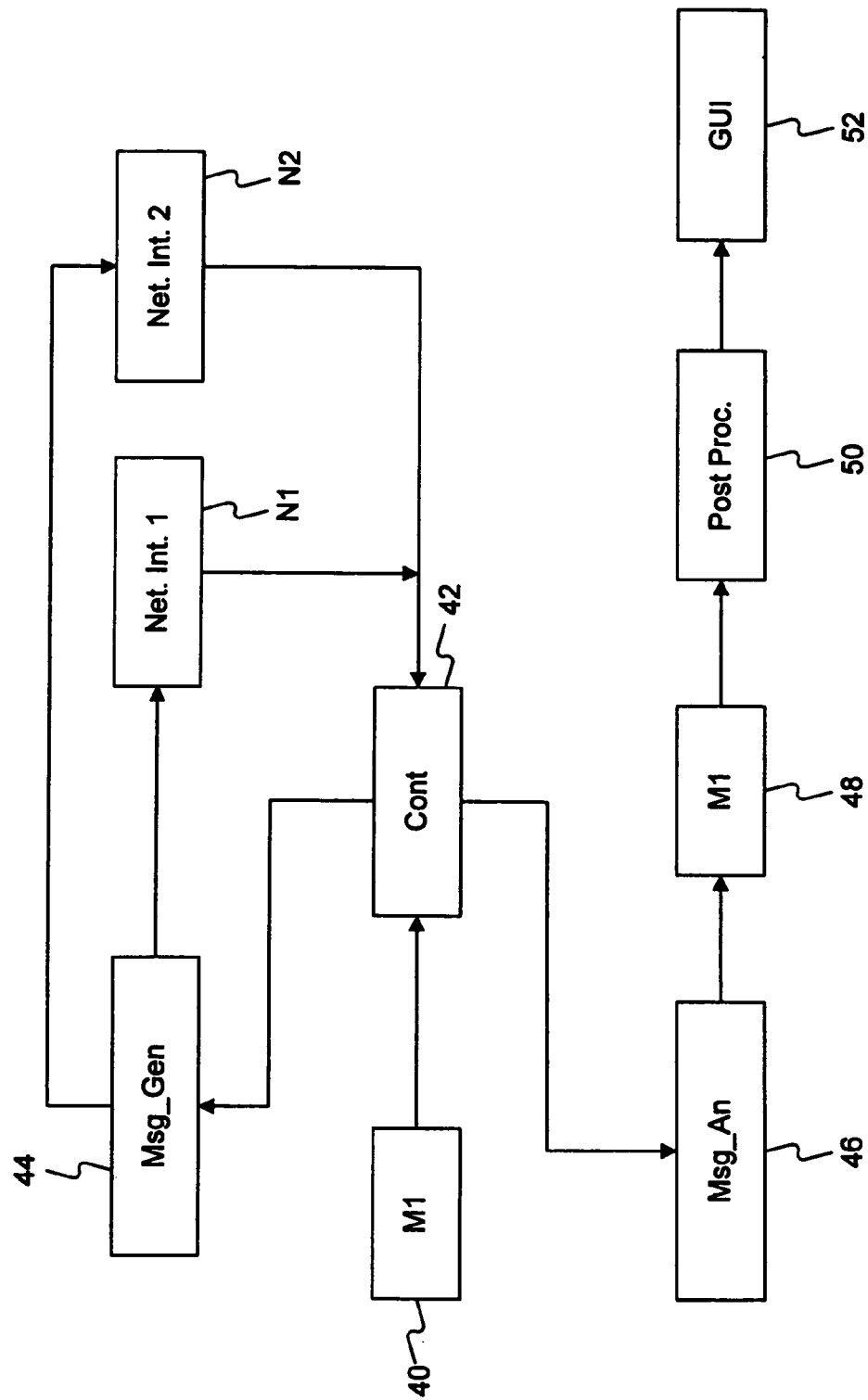
FIG. 4 shows a block diagram of a computer system according to the invention.

FIG. 4 shows a block diagram of part of additional computer 6. A memory M1 40 for storing inputs and identification data is connected to a controller Cont 42. Controller Cont 42 is connected to a message generator Msg_Gen 44 and a message analyzer Msg_An 46.

The message generator Msg_Gen is capable of:

generating a DHCPDISCOVER message according to parameters provided by the memory M1 through the controller Cont 42, and accordingly sending a such message through the network interfaces Net. Int. 1 N1 and Net. Int. 2 N2.

The controller Cont 42 is capable of monitoring the network interfaces Net. Int. 1 N1 and Net. Int. 2 N2. for DHCPOFFER packets in response to an earlier DHCPDISCOVER message. It is further capable of submitting such packets to a message analyzer Msg_An 46.

The message analyzer Msg_An 46 is capable of analyzing a DHCPOFFER packet received from the controller Cont 42 according to parameters from the memory M1 40, and of accordingly outputting an analyzed message.

The message analyzer Msg_An 46 is further capable of selectively storing analyzed messages in a memory M2 48, in function of parameters from the memory M1 40. Memories M1 40 and memory M2 48 are different for presentation purposes, yet they are part of a standalone memory disk.

The content of memory M2 48 is then available for a post processing unit Post Proc. 50 which can in turn output it to the user interface GUI 52.

Figure 5:
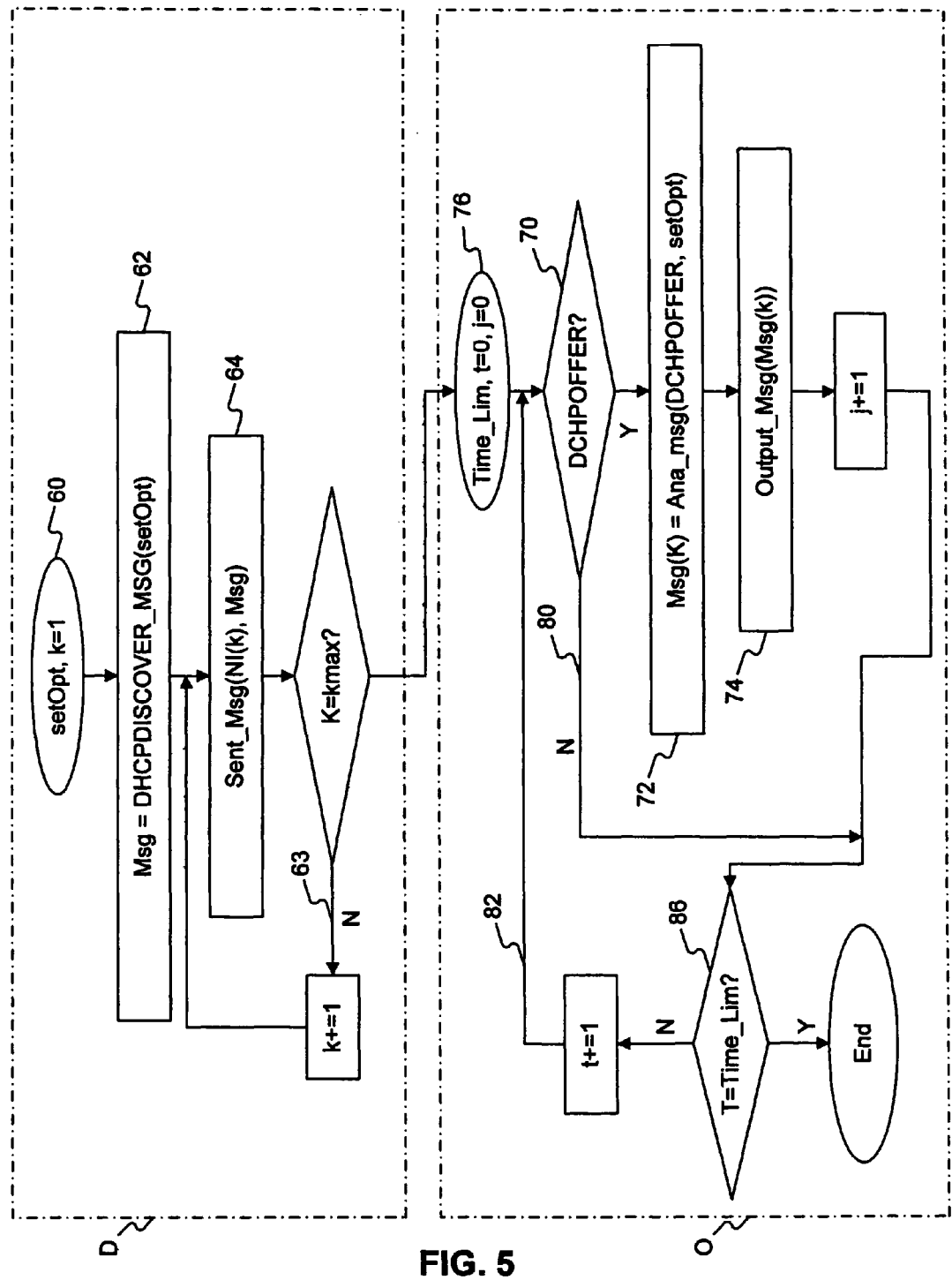
FIG. 5 shows an algorithm used in the computer of FIG. 4.

In FIG. 3, block A is sending a DHCPDISCOVER message and receiving and treating DHCPOFFER messages. FIG. 5 comprises of two main blocks D and 0 corresponding respectively to the generation of an appropriate DHCPDISCOVER message and the sniffing, analyzing and outputting of DHCPOFFER messages in response.

In block D, a set of options setopt 60 is input from the user and stored in the first memory M1 40. The options in setopt 60 are described in Annex 1.

As Annex 1 shows, there are eight different options available. Those options are stored in memory M1.

The -q option enables the user to specify the MAC address contained in the DHPCDISCOVER message. By inputting the MAC address of the network interface of computer 2, additional computer 6 is enabled to emulate the role of computer 2 in a DHCP communication and to monitor it.

The -i option enables additional computer 6 to use several networks interfaces to send the same DHCPDISCOVER message. As explained below, this improves the monitoring and testing abilities.

The -m option enables additional computer 6 to modify the IP header part of the DHCPDISCOVER packet in order to send a packet on the network fully emulating computer 2, as if it was originating from computer 2's network interface.

The -t option enables the user to specify the amount of time for which the system will sniff for DHCPOFFER packets. The -d option specifies that the whole of the received DHCPOFFER messages are to be output, opposed to their DHCP content only.

The -c option enables the user to further emulate computer 2 by specifying in the DHCPDISCOVER message which hardware class it belongs to. This option is useful in some networks where the DHCP server will only agree to communicate with machines specifying selected hardware classes.

The -l option enables the user to list all the network interfaces of additional computer 6 that are active and thus available for monitoring and testing.

The options setOpt 60 are stored in memory M1 40. The message generator Msg_Gen 44 comprises a function DHCPDISCOVER_MSG( ), which will create a packet Msg 62. The controller Cont 42 comprises a function Send_Msg( ) 64. This function will set a loop 63 to send the packet Msg 62 through each of the designated network interfaces, in accordance with the current options setOpt 60. Send-Msg( ) 64 uses a function NI( ) which outputs an address of each network interface of additional computer 6 designated in the options setOpt 60.

The block O is a double loop 80 and 82 in which a timer 76 is initiated (76). Additional computer 6 listens to the broadcast address of the network for DHCPOFFER messages intended to the computer 2 it is emulating. That is to say additional computer 6 listens and grabs the DHCPOFFER messages directed to the MAC address comprised in the DHCPDISCOVER message sent according to the input options setopt 60.

Assume now that a network interface of additional computer 6 receives a DHCPOFFER packet 70. It sends that packet to the controller Cont 42, which in turn inputs it in the message analyzer Msg_An 46. A function Ana_msg( ) of the message analyzer Msg_An 46 outputs a message Msg(k) 72 comprising the DHCP message content, and further contents as may be derived from the DHCPOFFER packet 70, according to the options setOpt 60. The message analyzer Msg_An 46 then selectively stores message Msg(k) 72 in the memory M2 48 via a function Output_Msg(Msg(k)) 74. Then, it checks if the timer (86) is past a limit Time_Lim. Annex 2 shows an output example of a message Msg(k) 72.

Performing analysis with computer 6 has no intrusive influence on the network and DHCP servers since additional computer 6 is not allowed to send any DHCPREQUEST message. This means neither the DHCP handshaking nor the lease of an IP address can be completed.

Furthermore, the wide range of options available to the user enables to perform awry wide variety of tests. A thorough diagnosis of the DHCP servers connected to the network which the computer 2 has problem booting on can be performed with those tests.

For example, in the configuration of FIG. 1, where there are several DHCP servers for the network SN1, each DHCP server 4 contains a correspondence table in which a MAC address corresponds to a leasable IP address.

Two of those servers contain the MAC address of the network interface of computer 2. Whenever a MAC address is present in the correspondence table of two or more DHCP servers, the corresponding leasable IP address has to be the same.

Thus, a network administrator can check the DHCP servers as follows:

_assume additional computer 6 emulates computer 2 and that there are two DHCP servers with correspondence tables containing the MAC address of the network interface of computer 2;

_thus, computer 6 is supposed to receive two DHCPOFFER packets.

Of course, those DHCPOFFER packets are supposed to be substantially identical. If additional computer 6 receives two different DHCPOFFER messages from those DHCP servers or if one or more server does not respond, then there is a problem with one of the DHCP servers.

Conversely, if several network interfaces are used on additional computer 6, it should receive substantially identical DHCPOFFER messages from the various DHCP servers. The absence or difference of those messages will help the network administrator diagnosing the problem with one or more of the DHCP servers.

The example described herein is to be interpreted in a non restrictive manner, and the scope of the invention encompasses all alternatives accessible to those skilled in the art.

---

ANNEX 1

```
Options
   _h or _? or no parameters
      To request help.
   _q MAC
      To specify the MAC address to request the configuration
      for.
      Format XX:XX:XX:XX:XX:XX. Not necessary two Xs. Case
      ignored.
      If _q is not present, the utility will not send, only
      listen.
   _i if
      To specify the interface to use. Default all.
```

-continued

ANNEX 1

```
   _m method
      To specify methodology to use:
         1 to use normal sockets. May not work with all
         servers.
         2 to use raw sockets. May not work with all
         servers.
            Default for Solaris.
         3 to use PF_PACKET sockets. Default for linux.
         4 to use SOCK_PACKET sockets. Obsolete. Try
         option 3.
   _t sec
      To specify seconds to sniff packets. 0 to disable
      timer. Default 10.
   _v
      Verbose report. Default no.
   _c class
      To specify the class.
```

A number will specify the class from this table:

```
   0: \0
   1: SUNW.UltraSPARC_Ili_cEngine
   2: SUNW.Ultra_5_10
   3: SUNW.Ultra_60
   4: SUNW.NetracCT_410
   5: SUNW.Netra_CP2300
   A higher number or a zero will send \0 as class. If _c is not
   specified then no class will be send. Anything else will be
   considered as the class string.
   _l
      To list interfaces that are not loopback.
```

---

ANNEX 2

```
#./dhcpsim4 _q 0:3:ba:2f:37:24 _v _c 5
DHCPSIM4 version 1.3 Bootp/Dhcp Generator and Sniffer. Jun
24 2004 19:55:56
Machine Endianess: Big
Simulated MAC Request: 00:03:BA:2F:37:24
Hardware Class: SUNW.Netra_CP2300
Socket method: Raw. Sends/Receives IP, UDP and DHCP messages.
WARNING: IP header may not work with all DHCP servers.
Interface to use: ALL
Time to sniff: 10 seconds.
Verbose: Yes.
[Send] socket open...OK
[Send] Include IP+UDP header...OK
[Send] Reuse address flag...OK
[Send] Broadcast flag...OK
[Send] Bind...OK
[Receive] socket open...OK
[Receive] Include IP+UDP header...OK
[Receive] Reuse address flag...OK
[Receive] Broadcast flag...OK
[Receive] Bind...OK
   _____>
DHCP message size: 548
IP header checksum = 0xa89e
UDP header checksum = 0x8b66
<____
SERVER: 10.10.1.3              GIVEN IP:   10.10.1.7
+Ethernet ---------------------------------+IP------------------------------------------+
|Destination: 00:03:BA:2F:37:24   |Version: 04                              |
|Source: 00:03:BA:2F:40:A4        |Length: 05 (20 bytes)                    |
|(Type: 0x0800                    | Differentiated Services Field: 0x10  |
+---------------------------------+ Total Length: 00328 bytes               |
|Identification: 0x0000           Fragment offset: 0x000                    |
|Time to live: 255                Protocol: 0x11                            |
|Checksum: 0x8DFD                                                           |
                                                                            |
|Source:10.10.1.3                 Destination: 255.255.255.255              |
+UDP -------------------------------------------------------------------------+
```

ANNEX 2-continued

```
|Source port: 00067          Destination port: 00068           |
|Length: 00308               Checksum: 0x0000                  |
+--------------------------------------------------------------+
+DHCP----------------------------------------------------------+
|Opcode: Boot Reply (2)      HW Address Type: 0x01             |
|HW Address Length: 006      Hops: 000                         |
|Transaction ID: 0x00002B32  Seconds: 00000                    |
|Flags: 0x8000 (BROADCAST)   Client IP: 0.0.0.0                |
|Your IP:10.10.1.7           Next Server IP: 10.10.1.3         |
|Relay Agent IP: 0.0.0.0     Server Name: 10.10.3.1            |
|Client HW Address: 00:03:BA:2F:37:24                          |
|Boot File Name: inetboot.sun4u.Solaris_8                      |
|Magic cookie: 0x63538263 (OK)                                 |
|Options Field:                                                |
| .DHCP Message Type: DHCPOFFER                                |
| .Server Identifier:10.10.1.3                                 |
| .Subnet Mask: 255.255.255.0                                  |
| .Router:10.10.1.1                                            |
| .Broadcast Address: 10.   10.1.255                           |
| .IP Address Lease Time: 0000604800 seconds                   |
| .End Option                                                  |
+--------------------------------------------------------------+
```

What is claimed is:

1. An emulation computer system for emulating a client computer on a network, said emulation computer system comprising:
a communication device configured to exchange messages over the network, said messages being exchanged with a server according to a first protocol, wherein said first protocol is a network protocol;
a discovery agent configured to send a first message to said server according to said first protocol with said communication device, wherein said first message includes (i) a selected identification data comprising a selected MAC address that identifies the client computer to be emulated on the network and (ii) a first message content satisfying a second protocol, and wherein said first message indicates a request that a response to said first message be sent from the server to the client computer to be emulated in accordance with said second protocol;
an analysis agent configured to intercept a second message sent for receipt at the client computer to be emulated received in response to the first message, and to extract, from said second message, a second message content, wherein contents of said second message content is in accordance with said second protocol, wherein said second message content indicates a request for a response to said second message to be sent to said server, and wherein said second message includes said selected identification data; and
a controller configured to operate said discovery agent and said analysis agent so as to emulate said client computer being emulated over a selected period of time, wherein said controller refrains the emulation computer system from sending a response to said second message.

2. The emulation computer system according to claim 1, further comprising a user interface operable to selectively display the message content of each second message.

3. The emulation computer system according to claim 1, wherein said first protocol is TCP/IP.

4. The emulation computer system according to claim 3, wherein said second protocol is DHCP, and wherein said server is a DHCP server.

5. The emulation computer system according to claim 1, wherein the selected period of time is acquired from the user.

6. The emulation computer system according to claim 1, wherein the first message comprises a header according to the first protocol set at least partly in accordance with the first message content.

7. The emulation computer system according to claim 1, wherein the first message comprises computer hardware information.

8. The emulation computer system according to claim 1, wherein the first message content is set according to a set of options.

9. The emulation computer system according to claim 8, wherein the set of options is at least partly acquired from the user.

10. A method for emulating a client computer on a network, said method comprising the steps of:
generating, by a discovery agent of an emulation computer system, a first message that includes (i) a selected identification data comprising a selected MAC address that identifies the client computer to be emulated on the network and (ii) a first message content that satisfies a second protocol, wherein said first message indicates a request that a response to said first message be sent from the server to the client computer to be emulated in accordance with said second protocol;
sending, by said discovery agent system, said first message over the network to a server according to a first protocol, wherein said first protocol is a network protocol;
intercepting, with an analysis agent of the emulation computer system, a second message sent for receipt at the client computer to be emulated in response to said first message, wherein said second message includes the selected identification data;
extracting, with said analysis agent, from said second message, a second message content, wherein contents of said second message content is in accordance with said second protocol, and wherein said second message content indicates a request for a response to said second message to be sent to said server; and
operating, during said sending and recovering steps, with a controller of the emulation computer system, said discovery agent and said analysis agent so as to emulate said client computer being emulated over a selected period of time, wherein said controller refrains said emulation computer system from sending a response to said second message.

11. The emulation computer system according to claim 1, wherein said first message is an initial message of a handshaking protocol.

12. The method for emulating a client computer on a network according to claim 10, wherein said first message is an initial message of a handshaking protocol.

13. The method for emulating a client computer on a network according to claim 10, wherein the intercepting comprises:
listening for messages directed to the selected identification data of the client computer being emulated; and
grabbing one of the listened-to messages, wherein the one of the listened-to messages comprises the second message.

14. The method for emulating a client computer on a network according to claim 10, further comprising:
analyzing, with the emulation computer system, the extracted second message content.

15. The emulation computer system according to claim 1, wherein the analysis agent is configured to:
listen for messages directed to the selected identification data of the client computer being emulated; and grab one of the listened-to messages, wherein the one of the listened-to messages comprises the second message.

16. The emulation computer system according to claim 1, wherein the analysis agent is configured to analyze the extracted second message content.

\* \* \* \* \*